Patented Dec. 22, 1936

2,065,396

UNITED STATES PATENT OFFICE 2,065,396

CHEMICAL PULPING PROCESS

George A. Richter, Berlin, N. H., assignor to Brown Company, Berlin, N. H., a corporation of Maine No Drawing. Application March 30, 1936, Serial No. 71,679

6 Claims. (Cl. 92—11)

This invention relates to the chemical pulping of raw cellulosic material and more especially wood to produce cellulose or wood pulps superior to those resulting from the usual pulpmaking processes. The pulps produced by the process hereof are characterized by their high alpha cellulose content and easy bleachability. When derived from such woods as spruce, they are also possessed of high strength and tear resistance. They are hence adapted for conversion into high grade papers and into the various cellulose derivatives employed in the manufacture of artificial silk, films, lacquers, etc.

In accordance with the present invention, chipped wood or other raw cellulosic material is exposed to an atmosphere of moist hot sulphur dioxide gas for a period of at least about one hour preparatory to being pulped in an alkaline liquor, for instance, an alkaline cooking liquor of the sort used in the production of kraft pulp. The initial envelopment or gasification of the chipped wood with sulphur dioxide gas is carried out under humidity and elevated temperature conditions capable of promoting the desired chemical change in certain wood constituents in a reasonably short period of time, that is, chemical change such that subsequent cooking of the wood in an alkaline liquor will yield pulp of the desired superior quality. Thus, it is preferable that the gasifying atmosphere of sulphur dioxide in contact with the chips be maintained at a temperature of at least about 80° C. and that it be laden with sufficient water vapor to be substantially saturated, that is, at the dew-point, at the particular elevated temperature at which gasification of the chips takes place. It is evidently the case that in the presence of moisture and heat the sulphur dioxide gas hydrolyzes such wood constituents as the pentosans to produce reaction products more readily and completely dissolved when the wood is then cooked or pulped in alkaline liquor. Once gasification of the chips has been completed, the chips may be rid of the enveloping gasifying atmosphere and such residual sulphur dioxide as is present therein may be expelled therefrom by a current of hot air and/or by neutralization with alkali. The moisture necessary in the sulphur dioxide gasifying atmosphere may be furnished either as steam or be developed by exposing moist chips to sulphur dioxide gas at sufficiently elevated temperature.

I shall now give some examples of the process hereof as applied to the pulping of wood in appropriately subdivided form.

*Example 1.*—Spruce wood in the form of the usual chips may be put into a digester or rotary kiln wherein they are exposed for about two hours to an atmosphere of moist sulphur dioxide gas heated to a temperature of about 90° to 100° C. The moisture content of the chips and/or steam commingled with the hot sulphur dioxide gas should be sufficient to maintain the gasifying atmosphere substantially saturated with water vapor throughout the treatment of the chips. At the end of a two-hour period, the chips are thoroughly penetrated with the moist sulphur dioxide gas and the desired hydrolysis of pentosan groups associated with the raw wood has been effected, as reflected in the quality of the pulp producible therefrom by subsequent cooking in an alkaline liquor. The residual or excess sulphur dioxide present in the gasified chips may be removed therefrom by sweeping them with hot air or by subjecting them while in a closed vessel, for instance, the very digester in which gasification is performed, to the evacuating action of a vacuum pump. The sulphur dioxide swept or evacuated from the chips may be recovered in a suitable absorption tower and reused.

The pretreated chips may then be pulped in unwashed condition in an alkaline cooking liquor containing about 2.4 pounds of active alkali, calculated as $Na_2O$ equivalent, per cubic foot. The active alkali may be present in the liquor as both caustic soda and sodium sulphide, about 25% to 40%, for instance, being in the form of sodium sulphide and the rest being in the form of caustic soda. Such a liquor is hence comparable to that ordinarily serving in the production of kraft pulp. Cooking of the chips may advantageously be performed for about three hours at about 335° F. in a liquor of this character used in such volume as to contain about 0.15 to 0.30 pound of active $Na_2O$ per pound of original dry wood. At the end of such cooking period, the chips are thoroughly pulped with a yield of pulp product of about 40 to 42%, based on original dry wood. The more important qualities of the resulting pulp are tabulated below alongside of the qualities of the usual commercial kraft pulp.

| Tests | Pulp reduced by process hereof | Usual commercial kraft pulp |
|---|---|---|
| Bursting strength | 140 to 145 | 155 to 160 |
| Tear resistance | 380 | 240 |
| Alpha cellulose | 95.5 | 89 |
| Pentosans | 3% | 9% |
| Lignin | 2% | 4% |

So far as concerns the strength and tear resistance values, it might be noted that the tests were made on samples beaten for one hundred minutes in a ball mill and formed into handsheets under standard conditions of pulp-testing. It will be observed that the pulp produced by the process hereof has a bursting strength almost equal to that of the usual commercial kraft pulp and that its more important physical quality of tear resistance is markedly higher than that of the kraft pulp. Moreover, its chemical composition is conspicuously superior to that of the kraft pulp, as can be seen from its notably higher alpha cellulose content, lower pentosan content, and lower lignin content. Its distinctly greater chemical purity is displayed also in terms of its comparatively easy bleachability; and it may be brought to the whiteness of the usual commercial bleached sulphite pulp without appreciable loss of its strength or tear resistance, particularly when hypochlorite bleach liquors containing free alkali throughout the bleaching treatment are employed.

*Example 2.*—Birch or other hardwood in the usual chipped form and containing about 30 to 50% moisture, based on dry wood, may be put into a digester and the digester closed, whereupon liquid sulphur dioxide may be injected into the digester in the amount of, say, about 1%, based on dry wood. Saturated steam at a temperature of 100° C. or greater may then be introduced into the digester to heat the mass of chips throughout to a temperature of about 90° to 100° C. and the mass kept at such temperature for about two hours. The chips may thus be surrounded or enveloped by a gaseous atmosphere of sulphur dioxide saturated with water vapor and under superatmospheric pressure, say, 10 to 30 pounds gauge. By reason of the pressure developed in the vaporization of the liquid sulphur dioxide and, when saturated steam at higher than 212° F. is employed, the steam pressure, the chips are rapidly and completely penetrated by the moist hot sulphur dioxide and thus undergo the desired chemical change preparatory to being pulped or cooked in an alkaline liquor. After the gasifying treatment, the gaseous atmosphere of the digester may be released into a suitable sulphur dioxide recovery system. Such sulphur dioxide as remains in the chips may, if desired, be expelled by hot air or be evacuated therefrom, as previously described.

The pretreated chips may then be pulped or cooked in an alkaline liquor under conditions similar to those described in Example 1. The resulting pulp is, by virtue of its hardwood origin, of shorter average fiber length and hence of lower bursting strength and tear resistance than the wood pulp of spruce origin produced according to Example 1. However, the pulp product of the instant example is of a chemical composition similar to that of Example 1 and, when bleached, is admirably adapted for conversion into such cellulose derivatives as cellulose xanthate, cellulose nitrate, cellulose acetate, etc. It is also valuable in papermaking furnishes to be formed into papers of fine-grained or fine-textured surface, for instance, printing or book papers. In this connection, it might be noted that the wood pulp product of the instant example, although derived from hardwood, has a pentosan content of only about 3% to 5%. When deciduous wood, i. e. hardwood, is pulped by cooking as ordinarily in so-called kraft cooking liquor, the resulting pulp is considerably richer in pentosans than pulps produced by similarly cooking such coniferous woods as spruce, fir, and the like. Indeed, when birch and other deciduous woods, which are much higher in pentosan content to begin with than coniferous woods of the character of spruce and fir, are pulped by the usual kraft process, yield wood pulps of a pentosan content of about 15% to 18%. This demonstrates the high effectiveness of the initial wood-gasifying treatment with moisture-saturated, hot sulphur dioxide gas, as conducted heren, in promoting the elimination of pentosan groups from the wood, especially wood of high pentosan content, when the wood is subsequently pulped by cooking in alkaline liquor.

*Example 3.*—The sawdust of suitable wood, such as spruce, may be exposed for about two to three hours, as in a rotary kiln, to moist hot sulphur dioxide gas at 80° to 100° C. The sulphur dioxide gas, which may be so-called sulphur-burner gas and contain about 14% to 18% sulphur dioxide, may be admixed with sufficient water vapor or steam to be substantially saturated and be circulated and re-circulated through the kiln with such fresh additions of sulphur dioxide gas as may be necessary to maintain the desired $SO_2$ content in the gaseous atmosphere enveloping the sawdust. As the kiln rotates, fresh sawdust surfaces are constantly exposed to the gaseous medium circulating through the gas space in the kiln. The pretreated sawdust may be cooked in an alkaline liquor as described in Example 1 to produce a finished, granular cellulose product of very low pentosan content, namely about 1%. The resulting cellulose product, besides possessing chemical purity even better than that of the products of Examples 1 and 2, is characterized by a distinctly lower solution viscosity. In other words, cellulose derivatives prepared therefrom may be dissolved to form solutions of relatively low viscosity. The granular or fine particle size cellulose product of the instant example is, therefore, excellent base material for the preparation of cellulose derivatives.

The process of the present invention presents the advantage that hot gaseous sulphur dioxide laden with moisture substantially to its saturation point promotes in a relatively short period of time chemical change in wood constituents of an order such that the subsequent cooking or pulping of the wood in alkaline liquor leads to wood cellulose or wood pulp of definitely higher quality and purity than that to be realized from the cooking operation alone. The use of sulphur dioxide in gaseous state also enables easy removal and recovery of such sulphur dioxide as is not consumed by reaction with the wood; and no washing of the wood is necessary after its gasification. Of course, when sawdust is the material gasified with sulphur dioxide, the step of washing the sawdust free of sulphur dioxide residues prior to its cooking in alkaline liquor may be included, since sawdust is easily suspended in wash water and it may then be settled out in tanks from the wash water or separated therefrom, as on rotary vacuum filters. Such sulphur dioxide residues as are retained by wood chips may, if desired, be neutralized with spent or "black" alkaline liquor preparatory to the cooking of the chips in fresh alkaline liquor under the conditions hereinbefore described. It is to be understood that the alkaline pulping liquor need not necessarily contain sodium sulphide. Thus, it may contain essentially only caustic soda; or it may contain caustic soda and sodium sulphite or caustic soda, sodium sulphite, and sodium sulphide.

I claim:

1. A process of producing pulp from raw cellulosic material, which comprises enveloping such material with an atmosphere of moist sulphur dioxide gas at a temperature of at least about 80° C., removing such enveloping atmosphere from the material, and cooking such material in an alkaline liquor to form cellulose pulp.

2. A process of producing pulp from raw cellulosic material, which comprises enveloping such material with an atmosphere of sulphur dioxide gas at a temperature of at least about 80° C. and laden with water vapor substantially to the saturation point at such temperature, removing such enveloping atmosphere from the material, and cooking such material in an alkaline liquor to form cellulose pulp.

3. A process of producing pulp from wood, which comprises enveloping the wood in subdivided form with an atmosphere of moist sulphur dioxide gas at a temperature of at least about 80° C., removing such atmosphere from the wood after an enveloping period of at least about one hour, and cooking the wood in an alkaline liquor to form wood pulp.

4. A process of producing pulp from wood, which comprises enveloping the wood in subdivided form with an atmosphere of sulphur dioxide and water vapor at a temperature of at least about 80° C., said atmosphere being substantially saturated with the water vapor at such temperature, removing such atmosphere from the wood after an enveloping period of at least about one hour, and cooking the wood in an alkaline liquor to form wood pulp.

5. A process of producing pulp from wood, which comprises confining a mass of wood in chipped form in an atmosphere of sulphur dioxide gas while heating the mass with steam to a temperature of at least about 80° C. and thereby substantially saturating atmosphere with water vapor, removing such atmosphere from the mass after its confinement for about one hour, and cooking the mass in an alkaline liquor to form wood pulp.

6. A process of producing substantially pure alpha cellulose from wood, which comprises enveloping the wood as a mass of sawdust with an atmosphere of moist, hot sulphur dioxide gas, removing such atmosphere from the mass, and cooking the mass in an alkaline liquor under conditions to extract therefrom substantially all of its non-alpha cellulose components.

GEORGE A. RICHTER.